US012681827B2

(12) United States Patent
Nishioka et al.

(10) Patent No.: US 12,681,827 B2
(45) Date of Patent: Jul. 14, 2026

(54) INFORMATION PROCESSING DEVICE, INFORMATION PROCESSING METHOD, AND RECORDING MEDIUM

(71) Applicant: NEC Corporation, Tokyo (JP)

(72) Inventors: Jun Nishioka, Tokyo (JP); Yoshiaki Sakae, Tokyo (JP); Takashi Konashi, Tokyo (JP); Hiroki Tagato, Tokyo (JP); Yuji Kobayashi, Tokyo (JP); Etsuko Ichihara, Tokyo (JP); Jun Kodama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/561,027

(22) PCT Filed: May 21, 2021

(86) PCT No.: PCT/JP2021/019343
§ 371 (c)(1),
(2) Date: Nov. 15, 2023

(87) PCT Pub. No.: WO2022/244228
PCT Pub. Date: Nov. 24, 2022

(65) Prior Publication Data
US 2024/0370345 A1      Nov. 7, 2024

(51) Int. Cl.
*G06F 11/30*          (2006.01)
*G06F 16/2458*        (2019.01)
(52) U.S. Cl.
CPC ...... *G06F 11/3072* (2013.01); *G06F 16/2477* (2019.01)

(58) Field of Classification Search
CPC ......................... G06F 11/3072; G06F 16/2477
See application file for complete search history.

(56) References Cited

U.S. PATENT DOCUMENTS

| | | | |
|---|---|---|---|
| 11,860,940 B1* | 1/2024 | Batsakis ............. | G06F 16/2471 |
| 2012/0310960 A1 | 12/2012 | Watanabe et al. | |
| 2018/0046926 A1* | 2/2018 | Achin ...................... | G06N 5/02 |
| 2018/0196864 A1* | 7/2018 | Xu ......................... | G06F 16/178 |
| 2019/0097904 A1* | 3/2019 | Park ...................... | H04L 43/045 |
| 2019/0130040 A1* | 5/2019 | Ma ....................... | G06F 16/9038 |
| 2019/0236149 A1* | 8/2019 | Kuruvada ............... | G06F 16/14 |

(Continued)

FOREIGN PATENT DOCUMENTS

| | | |
|---|---|---|
| CN | 111105048 A | 5/2020 |
| JP | 2012-252658 A | 12/2012 |

(Continued)

OTHER PUBLICATIONS

International Search Report for PCT Application No. PCT/JP2021/019343, mailed on Jul. 20, 2021.

*Primary Examiner* — Courtney Harmon
(74) *Attorney, Agent, or Firm* — Sughrue Mion, PLLC

(57)          ABSTRACT

In an information processing device, a provision means provides multiple terminals with a common search model. A filter acquisition means acquires, from each terminal, a filter configured by a feature value obtained using the search model. A data acquisition means acquires, from each terminal, a target time series data subjected to state estimation. A estimation means estimates a state of the terminal which outputted the target time series data, based on the target time series data and the filter.

8 Claims, 12 Drawing Sheets

<FILTER GENERATION METHOD>

(56) References Cited

U.S. PATENT DOCUMENTS

2019/0354491 A1     11/2019  Tada et al.
2020/0311141 A1*   10/2020  Nowakiewicz ... G06F 16/24545
2023/0267307 A1*    8/2023  Wang ..................... G06N 3/006
                                                            706/25

FOREIGN PATENT DOCUMENTS

JP          2013-004038  A     1/2013
WO          2018/135310  A1    7/2018

* cited by examiner

<SEARCH METHOD USING FILTER>

<SERVER>

<SERVER>

INFORMATION PROCESSING DEVICE, INFORMATION PROCESSING METHOD, AND RECORDING MEDIUM

This application is a National Stage Entry of PCT/JP2021/019343 filed on May 21, 2021, the contents of all of which are incorporated herein by reference, in their entirety.

TECHNICAL FIELD

The present disclosure relates to processing of data obtained by a plurality of terminals.

BACKGROUND ART

There is known a method for searching information distributed and stored in a plurality of terminals using an index prepared for each terminal. For example, Patent Document 1 discloses a technique for specifying a data block in which the data to be searched exists, by referring to a hierarchical-type divided and transposed bloom filter, when the data to be searched is given.

PRECEDING TECHNICAL REFERENCES

Patent Document

Patent Document 1: Japanese Patent Application Laid-Open under No. JP 2012-252658

SUMMARY

Problem to Be Solved

One object of the present disclosure is to estimate the state of each terminal using time series data obtained in the terminal.

Means for Solving the Problem

According to an example aspect of the present invention, there is provided an information processing device comprising:

a provision means configured to provide multiple terminals with a common search model;

a filter acquisition means configured to acquire, from each terminal, a filter configured by a feature value obtained using the search model;

a data acquisition means configured to acquire, from each terminal, a target time series data subjected to state estimation; and an estimation means configured to estimate a state of the terminal which outputted the target time series data, based on the target time series data and the filter.

According to another example aspect of the present invention, there is provided an information processing method comprising:

providing multiple terminals with a common search model;

acquiring, from each terminal, a filter configured by a feature value obtained using the search model;

acquiring, from each terminal, a target time series data subjected to state estimation; and estimating a state of the terminal which outputted the target time series data, based on the target time series data and the filter.

According to still another example aspect of the present invention, there is provided a recording medium recording a program, the program causing a computer to execute processing comprising:

providing multiple terminals with a common search model;

acquiring, from each terminal, a filter configured by a feature value obtained using the search model;

acquiring, from each terminal, a target time series data subjected to state estimation; and estimating a state of the terminal which outputted the target time series data, based on the target time series data and the filter.

Effect

According to the present disclosure, the state of each terminal can be estimated using time series data obtained in the terminal.

EXAMPLE EMBODIMENTS

Preferred example embodiments of the present invention will be described with reference to the accompanying drawings.

Basic Concept

Figure 1:
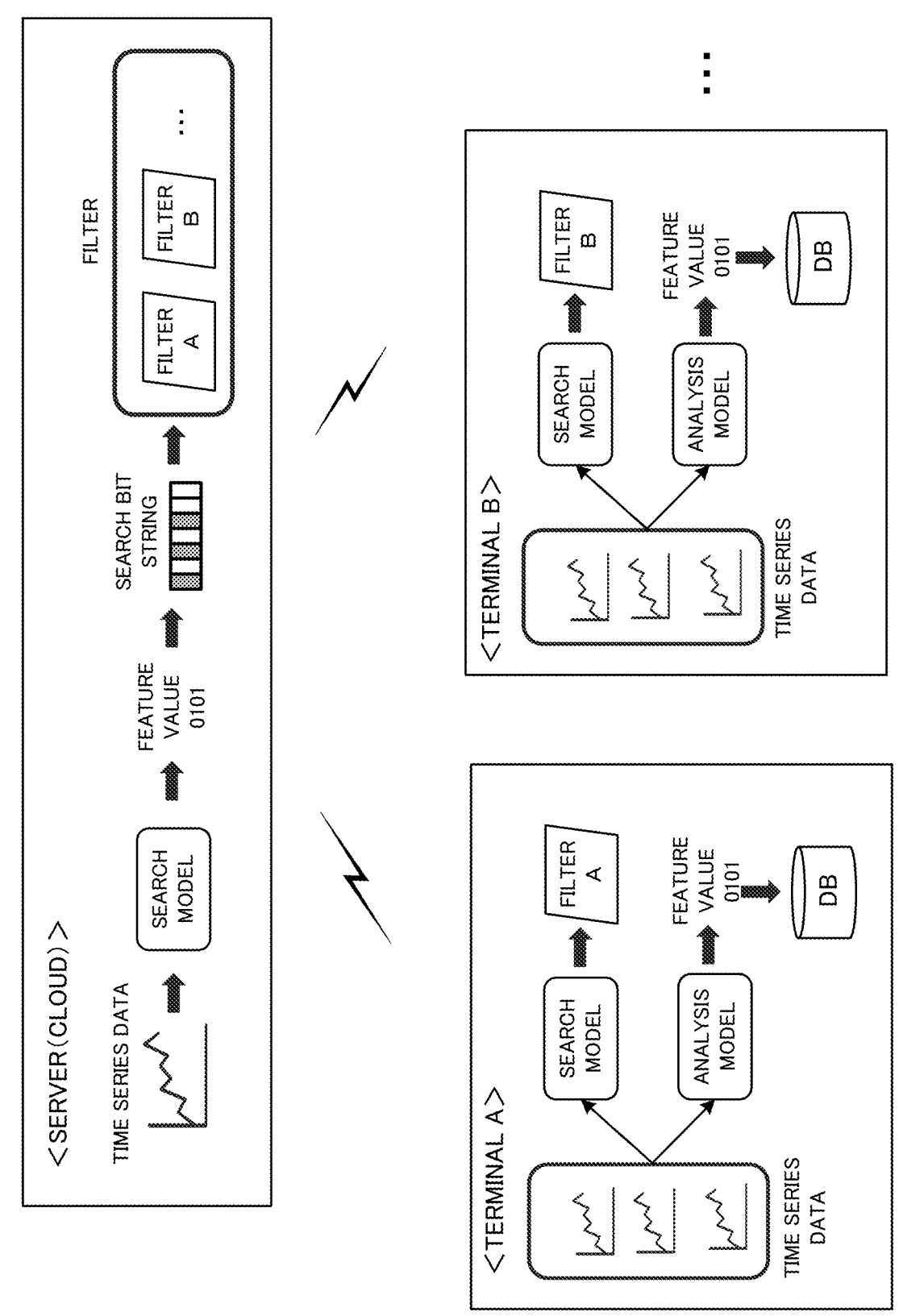
FIG. 1 shows a basic concept of a present example embodiment.

First, a basic concept of the example embodiment will be described. In the present example embodiment, the state of the multiple terminals is managed by the server (cloud) side. FIG. 1 shows the basic concept of the present example embodiment. The server is configured to communicate with multiple terminals. Each terminal performs various processing and acquires time series data related to the processing state and situation. For example, measurement is performed in each terminal using a sensor or the like, and time series data is acquired. The time series data is not limited to the measurement data by the sensor, and it may be an image captured by a camera or a sound collected by a microphone.

Instead of storing the time series data as it is, each terminal converts the time series data into feature values and stores them in the database (hereinafter referred to as "DB"). Specifically, an analysis model is prepared for each terminal. The acquired time series data are converted into the feature values using the analysis model, and are stored in the DB. Thus, in the respective terminals, the feature values of the time series data obtained during the processing are stored in the DB.

The server can know the state of each terminal by referring to the feature value stored in the DB of each terminal. Now it is assumed that an abnormal state occurs in one terminal X, and the server wants to check whether or not a similar abnormal state has occurred in another terminal. In this case, the server checks whether or not the time series data similar to the time series data acquired in the terminal X in the abnormal state is occurring in another terminal. If the similar time series data is acquired in another terminal Y, the server can determine that the abnormal state similar to the terminal X is occurring in the terminal Y.

As the processing in this case, the server searches for the time series data detected in the abnormal state of the terminal X in each terminal. Specifically, first, the server transmits the time series data of the abnormal state to each terminal. Each terminal converts the time series data of the abnormal state into the feature value using the analysis model, and determines whether or not the same feature value as the feature value is stored in the DB. If the same feature value is found in the DB, it is determined that a similar abnormal state has occurred in the terminal. On the other hand, if the same feature value is not found in the DB, it is determined that the same abnormal state has not occurred in the terminal. Then, each terminal transmits the determination result to the server. Thus, the server can check whether or not the similar abnormal state has occurred in each terminal. While an abnormal state is detected in the above-described example, the server can detect a specific state of each terminal, not only an abnormal state.

As described above, the server can check the state of each terminal by searching for the time series data in each terminal. However, in this method, there occurs the processing load of converting the time series data to the feature value and searching the DB for the feature value in the multiple terminals. Further, in the case of an abnormal state or the like, the time required to detect the state may also become a problem.

In this view, in the present example embodiment, filters are generated in each terminal using a common search model, and the filters generated in each terminal are collected and held in the server. The server then uses the filters collected from each terminal to estimate whether or not each terminal is in a specific state. This eliminates the need to transmit the time series data from the server to each terminal and perform the search in each terminal, thereby enabling reduction in the processing load and the processing time.

Figure 2:
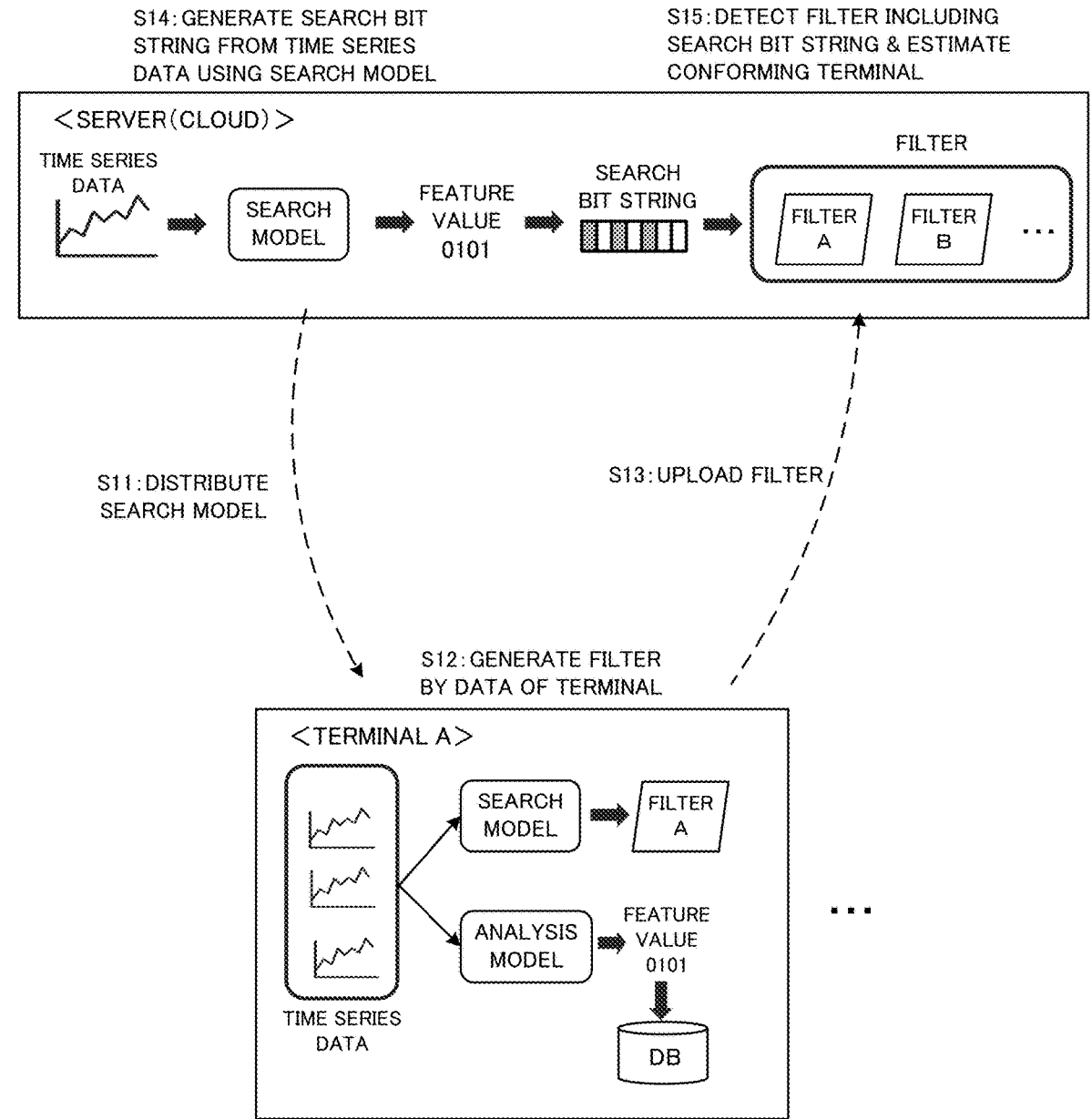
FIG. 2 shows an outline of a state estimation method of each terminal by a server.

FIG. 2 shows an outline of a state estimation method for each terminal by the server. First, the server distributes a common (identical) search model to the terminals. Hereinafter, an example using the terminal A will be described. First, the server distributes the search model to the terminal A (step S11). The terminal A inputs the time series data acquired by the terminal A to the search model to generate a filter A (step S12). The details of the generation method of the filter will be described later. Since the time series data used for the generation of the filter A is the same as the one which is converted to the feature value by the analysis model and stored in the DB, the filter A has a role as an index of the feature value stored in the DB. Then, the terminal A uploads the generated filter A to the server (step S13). Similarly, other terminals generate a filter using the common search model distributed from the server and upload the generated filter to the server. As a result, the filters of the respective terminals are collected in the server.

When detecting a terminal in the same state as the state in which the time series data is obtained as a certain terminal, the server generates a search bit string from the time series data using the search model (step S14). Concretely, the server converts the time series data into the feature value by inputting it into the search model, and generates the search bit string based on the feature value. The server then checks the search bit string with the filter of each terminal and estimates the terminal corresponding to the filter including the search bit string (hereinafter referred to as the "conforming terminal") (step S15). The conforming terminal is estimated to be in a state similar to that of the terminal whose time series data was obtained.

As described above, in the present example embodiment, the filter corresponding to the index of the time series data in each terminal is collected in advance in the server, and the filter is used to estimate whether or not the target time series data is in each terminal. Therefore, the state of each terminal can be basically estimated by the processing only on the server side. Further, the time series data may be transmitted to the conforming terminal for confirmation or the like based on the state estimation result on the server side, and used for the check with the feature value in the DB.

Figure 3:
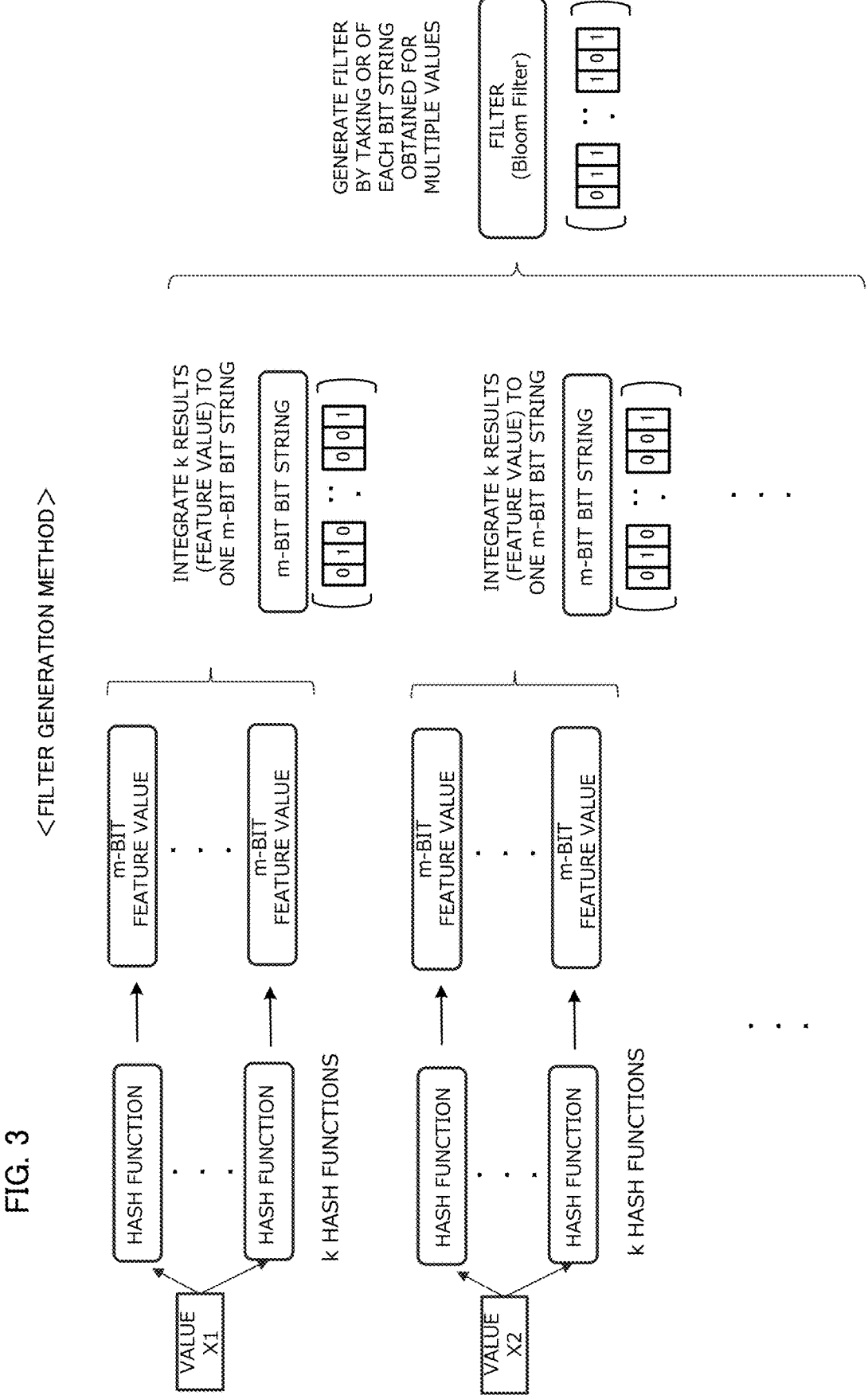
FIG. 3 shows a method of generating a filter in each terminal.

Next, the filter will be described in detail. FIG. 3 shows a method of generating a filter in each terminal. In the present example embodiment, a Bloom filter is generated in the respective terminals. The search model distributed from the server to each terminal is a model for generating a Bloom filter. Specifically, in each terminal, the time series data is inputted to the search model. In FIG. 3, it is assumed that the time series data has the value X (X1, X2, . . . ). The search model applies predetermined k hash functions to the inputted value X, and generates the m-bit feature value (hash code) using each hash function. Thus, the k pieces of m-bit feature values can be obtained for each value X.

Then, the search model integrates the k pieces of m-bit feature values thus obtained into one m-bit bit string. Specifically, the search model takes OR (logical sum) of the k pieces of m-bit feature values to generate one m-bit bit string. Thus, the search model generates one m-bit bit string for each value X. Then, the search model takes OR of the m-bit bit string obtained for each value X to generate the filter.

Figure 4A:
FIGS. 4A to 4E show a search method using a generated filter.

FIG. 4A shows a search method using the filter thus generated. As shown in FIG. 4A, at the time of search, the server inputs the time series data of search target (hereinafter also referred to as the target time series data) into the search model and obtains the feature values (hash code) using the k hash functions. When there is one target time series data, the server uses its feature value as the search bit string. On the other hand, if there are multiple target time series data, the server calculates the OR of the feature values of the respective target time series data and use it as the search bit string. Then, the server checks the search bit string with the filter of each terminal, respectively.

Figure 4B:
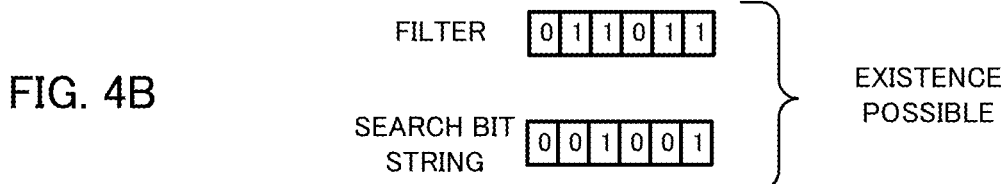
Figure 4C:
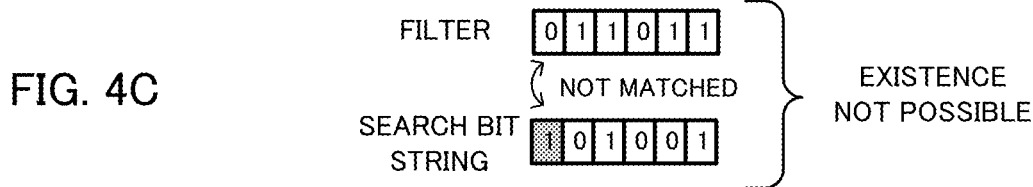

For simplicity, it is assumed that the filter and the search bit string has 6 bits. The server determines whether or not the search bit string is included in the filter. Here, the search bit string is included in the filter means that all the bits that are set to "1" in the search bit string are set to "1" in the filter. When the search bit string is included in the filter as shown in FIG. 4B, the server determines that there is possibility of existence, i.e., there is possibility that the target time series data may exist in the terminal. On the other hand, when the search bit string is not included in the filter as shown in FIG. 4C, the server determines that there is no possibility of existence, i.e., the target time series data is not included in the terminal. Incidentally, in the bloom filter, false positive (False Positive) occurs but false negative (False Negative) does not occur. Therefore, the server does not have to do further confirmation processing to the terminal that is determined to have no possibility of existence using the filter.

First Example Embodiment

Next, a description will be given of a first example embodiment.

Hardware Configuration

Figure 5A:
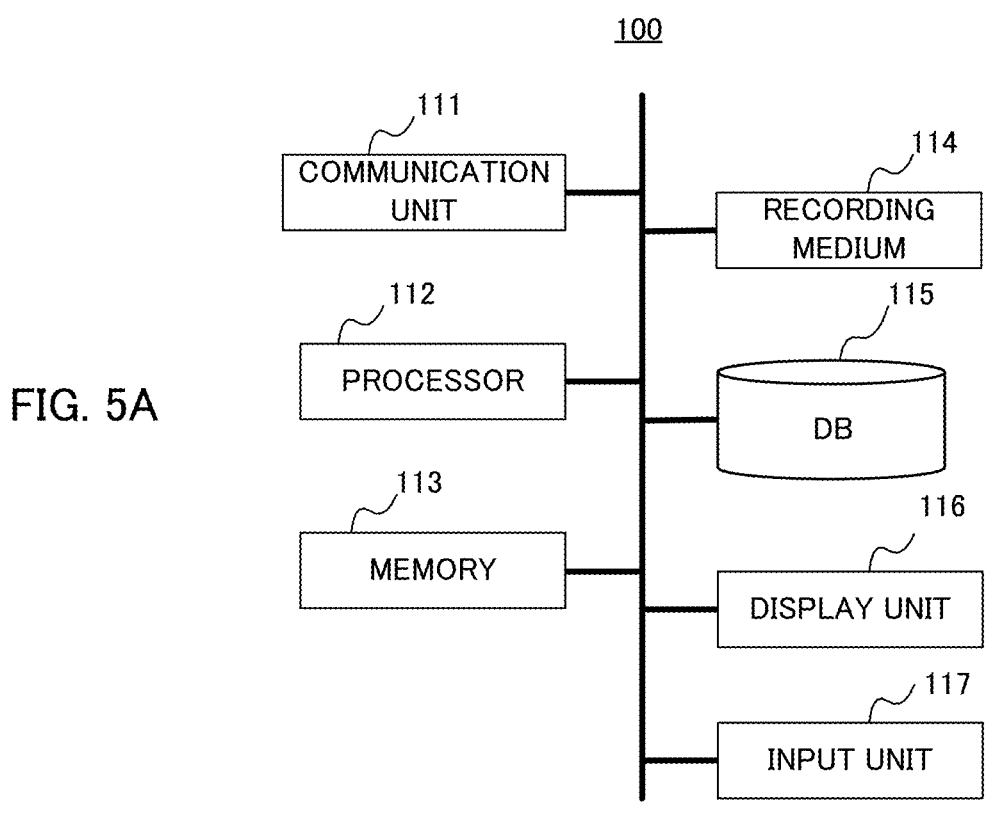
FIGS. 5A and 5B are block diagrams showing a hardware configuration of a server and a terminal according to a first example embodiment.

FIG. 5 is a block diagram illustrating a hardware configuration of the server 100 and the terminal 200 according to the first example embodiment. FIG. 5A shows the hardware configuration of the server 100. As shown in FIG. 5A, the server 100 includes a communication unit 111, a processor 112, a memory 113, a recording medium 114, a database (DB) 115, a display unit 116, and an input unit 117.

The communication unit 111 transmits and receives data to and from each terminal 200. Specifically, the communication unit 111 transmits a search model to each terminal 200 and receives a filter from each terminal 200.

The processor 112 is a computer, such as a CPU (Central Processing Unit), that controls the entire server 100 by executing programs prepared in advance. The processor 112 may be a GPU (Graphics Processing Unit), or a FPGA (Field-Programmable Gate Array). The processor 112 performs state estimation processing, which will be described later.

The memory 113 may include a ROM (Read Only Memory), a RAM (Random Access Memory), and the like. The memory 113 is also used as a working memory during various processing operations by the processor 112.

The recording medium 114 is a non-volatile and non-transitory recording medium such as a disk-like recording medium or a semiconductor memory and is configured to be attachable to and detachable from the server 100. The recording medium 114 records various programs executed by the processor 112. When the server 100 executes various processes, the program recorded in the recording medium 114 is loaded into the memory 113 and executed by the processor 112. The DB 115 stores target time series data which is subjected to the state estimation, the search model, and the filters collected from the terminals 200.

The display unit 116 is, for example, a liquid crystal display device and displays the result of state estimation by the server 100. The input unit 117 is an input device such as a mouse, a keyboard, or a touch panel, and is operated by an operator at the time of necessary instructions or input in the server 100.

Figure 5B:
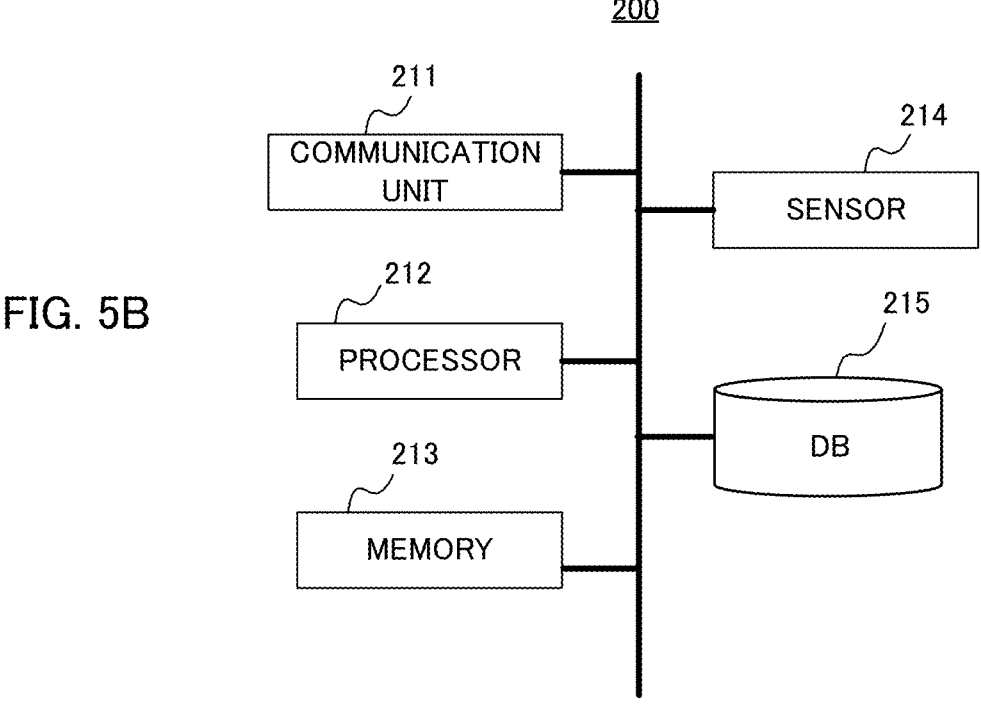

FIG. 5B shows the hardware configuration of the terminal 200. As shown in FIG. 5B, the terminal 200 includes a communication unit 211, a processor 212, a memory 213, a sensor 214, and a data base (DB) 215.

The communication unit 211 transmits and receives data to and from the server 100. Specifically, the communication unit 211 receives the search model from the server 100 and transmits the filter generated by the terminal 200 to the server 100.

The processor 212 is a computer, such as a CPU, that controls the entire terminal 200 by executing a program prepared in advance. The processor 212 may be a GPU or a FPGA. The processor 212 performs the filter generation processing described later. The memory 213 is configured by a ROM or a RAM. The memory 213 is also used as a working memory during various processing operations by the processor 212.

The sensor 214 generates the time series data related to the processing that terminal 200 executes. The time series data may be generated using a camera or a microphone, instead of the sensor. The DB 215 stores the time series data generated by the sensor 214, the feature values obtained by converting the time series data by the analysis model, the filter generated by the terminal 200, and the like.

Functional Configuration

Figure 6:
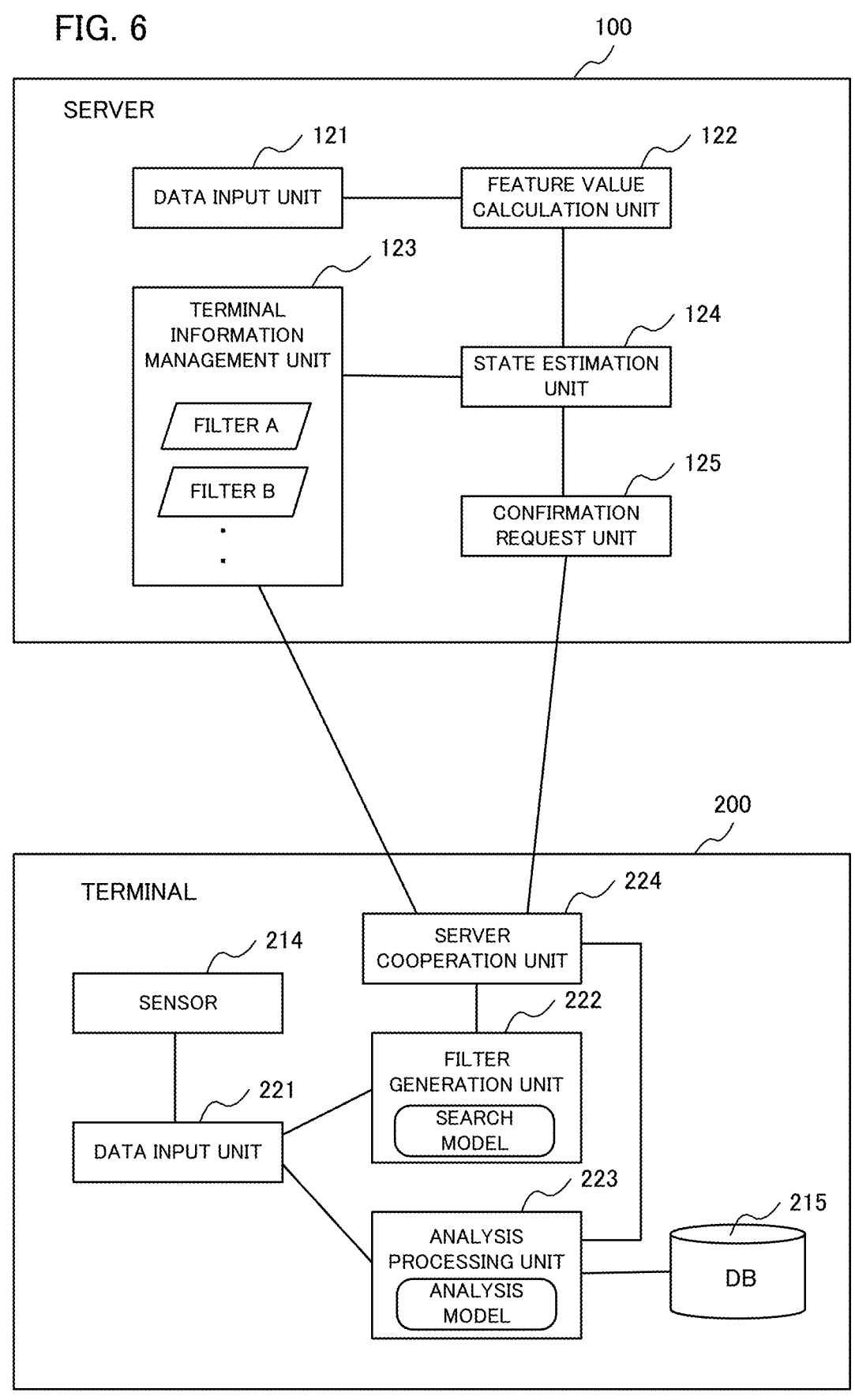
FIG. 6 is a block diagram showing a functional configuration of the server and the terminal.

FIG. 6 is a block diagram illustrating a functional configuration of a server 100 and a terminal 200. The server 100 includes a data input unit 121, a feature value calculation unit 122, a terminal information management unit 123, a state estimation unit 124, and a confirmation request unit 125. The terminal 200 includes a data input unit 221, a filter generation unit 222, an analysis processing unit 223, and a server cooperation unit 224, in addition to the sensor 214 and the DB 215.

First, the configuration of the terminal 200 side will be described. The sensor 214 continuously generates the time series data related to the processing performed in the terminal 200 and outputs the data to the data input unit 221. The data input unit 221 acquires the time series data from the sensor 214 and outputs it to the filter generation unit 222 and the analysis processing unit 223.

The analysis processing unit 223 performs regular analysis processing. That is, the analysis processing unit 223 converts the inputted time series data into the feature value using the analysis model prepared in advance and stores the feature value in the DB 215. Thus, the time series data measured by the sensor 214 is converted to the feature value, and the feature value is accumulated in the DB 215. The analysis processing unit 223 may perform necessary management for each terminal 200, for example, by issuing a warning when the feature value converted from the time series data corresponds to a predetermined abnormal state.

The filter generation unit 222 generates a filter to be provided to the server 100. The filter generation unit 222 converts each time series data inputted from the data input unit 221 to the bit string (hash code) using the search model distributed from the server 100, generates a filter by integrating the bit strings of multiple time series data, and outputs the filter to the server cooperation unit 224. The server cooperation unit 224 receives the search model from the server 100 and transmits the filter generated by the filter generation unit 222 to the server 100. Incidentally, the terminal 200 regularly generates a filter by the filter generation unit 222 and transmits the filter to the server 100, so that the latest filter generated in the terminal 200 is always held in the server 100.

Next, the configuration of the server 100 side will be described. To the data input unit 121, the target time series data which a target of the state estimation is inputted. For example, when detecting a specific state in each terminal 200, the target time series data corresponding to the state is inputted to the data input unit 121. The data input unit 121 outputs the inputted target time series data to the feature value calculation unit 122.

The feature value calculation unit 122 calculates the feature value from the inputted target time series data using the search model. Specifically, the feature value calculation unit 122 calculates the m-bit feature values from the target time series data using the k hash functions as described above to generate a search bit string and outputs the search bit string to the state estimation unit 124.

The terminal information management unit 123 distributes the search model to each terminal 200. The terminal information management unit 123 manages the information of each terminal 200. Also, the terminal information management unit 123 stores the filter collected from each terminal 200.

The state estimation unit 124 acquires the search bit string from the feature value calculation unit 122 and acquires the filter of each terminal 200 from the terminal information management unit 123 to estimate the state of each terminal. Specifically, the state estimation unit 124 collates the search bit string with the filter of each terminal 200. When the search bit string is included in the filter, i.e., when the search bit string conforms to the filter, the state estimation unit 124 estimates that there is possibility of existence of the target time series data in the terminal 200 corresponding to the filter. On the other hand, when the search bit string does not conform to the filter, the state estimation unit 124 estimates that there is no possibility of existence of the target time series data in the terminal 200 corresponding to the filter. The state estimation unit 124 estimates that the terminal 200 having the possibility of the existence of the target time series data has become the specific state indicated by the inputted time series data. Thus, by using the filters of the terminals 200 collected in advance, the server 100 can estimate that each terminal 200 corresponds to or corresponded to a specific state indicated by the time series data, only by the processing on the server 100 side, i.e., without making a query to each terminal 200.

As necessary, the confirmation request unit 125 transmits the confirmation request to the terminal 200 that is estimated to correspond to the specific state by the state estimation unit 124. Specifically, the confirmation request unit 125 transmits the time series data indicating the specific state to the terminal 200 and requests confirmation that the terminal 200 corresponds to the specific state. When receiving the confirmation request from the server 100, the server cooperation unit 224 in the terminal 200 receives the target time series data from the server 100 and outputs the data to the analysis processing unit 223. The analysis processing unit 223 converts the target time series data into the feature value using the analysis model, and determines whether or not the same feature value is stored in the DB 215. The analysis processing unit 223 outputs the determination result to the server cooperation unit 224, and the server cooperation unit 224 transmits the determination result to the confirmation request unit 125 of the server 100 as the confirmation result for the confirmation request. Thus, it is possible to perform confirmation based on the feature value stored in the DB 215 of the respective terminals 200, if necessary.

In the above-described configuration, the data input unit 121 is an example of a data acquisition means, the state estimation unit 124 is an example of an estimation means, and the terminal information management unit 123 is an example of a provision means and a filter acquisition means.

Filter Generation Processing

Figure 7:
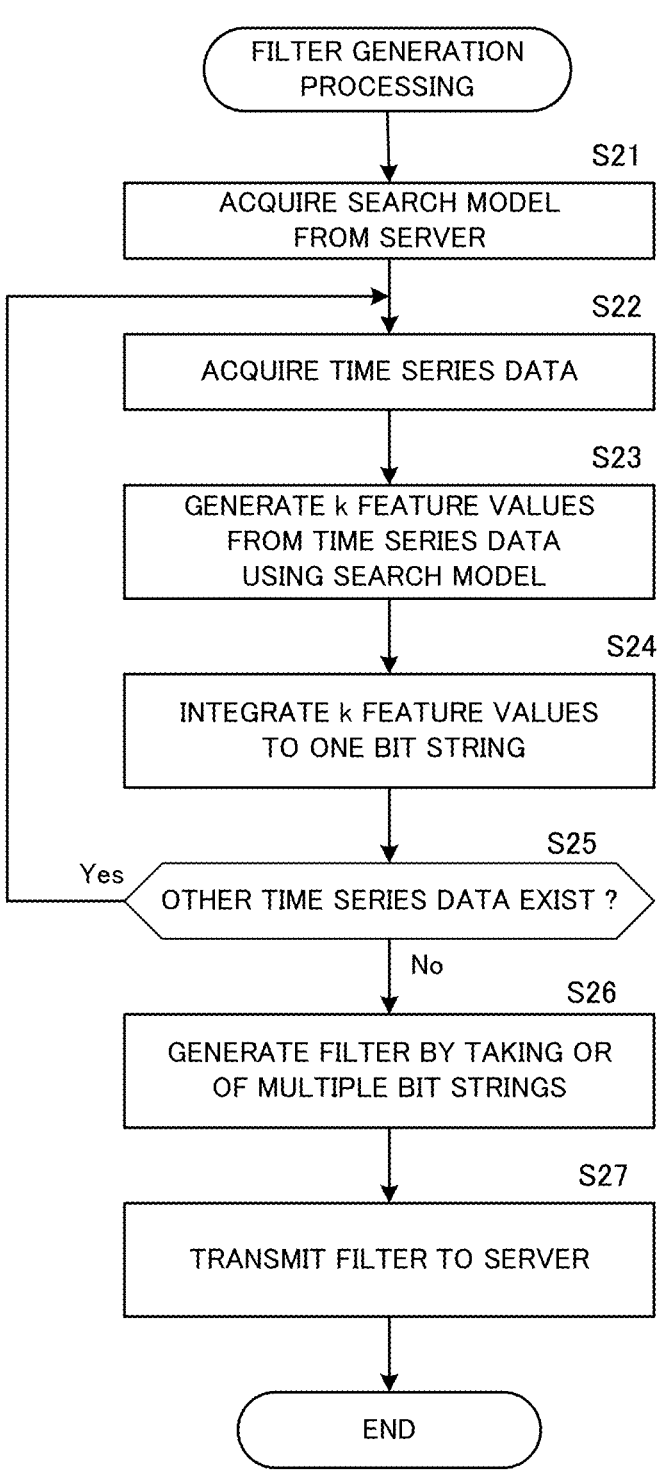
FIG. 7 is a flowchart of filter generation processing.

Next, filter generation processing in the terminal 200 will be described. FIG. 7 is a flowchart of the filter generation processing. This processing is realized by the processor 212 illustrated in FIG. 5B, which executes a program prepared in advance and operates as each element illustrated in FIG. 6.

First, the server cooperation unit 224 acquires a search model from the server 100 and supplies the search model to the filter generation unit 222 (step S21). Next, the filter generation unit 222 acquires the time series data measured by the sensor 214 from the data input unit 221 (step S22). Next, the filter generation unit 222 generates k feature values (hash codes) from the time series data using the search model (step S23), and integrates k feature values into one bit string (step S24).

Next, the filter generation unit 222 determines whether or not there is other time series data (step S25). Incidentally, the filter generation unit 222 groups a predetermined number of time series data, and generates a filter by the unit of the group. That is, in step S25, the filter generation unit 222 determines whether or not all the time series data belonging to one group is processed.

If there are other time series data (step S25: Yes), the process returns to step S22 and steps S22 to S24 are repeated. On the other hand, when there is no other time series data (step S25: No), the filter generation unit 222 takes OR of the multiple bit strings to generate a filter (step S26). Then, the server cooperation unit 224 transmits the generated filter to the server 100 (step S27).

Thus, the filter generated in each terminal 200 is transmitted to the server 100. The terminal 200 performs the above-described steps S22 to S27 every predetermined time, or every time when a predetermined amount of time series data is acquired, thereby to update the filter and transmits the filter to the server 100. Thus, the latest filter corresponding to each terminal 200 is always stored in the terminal information management unit 123 of the server 100.

State Estimation Processing

Figure 8:
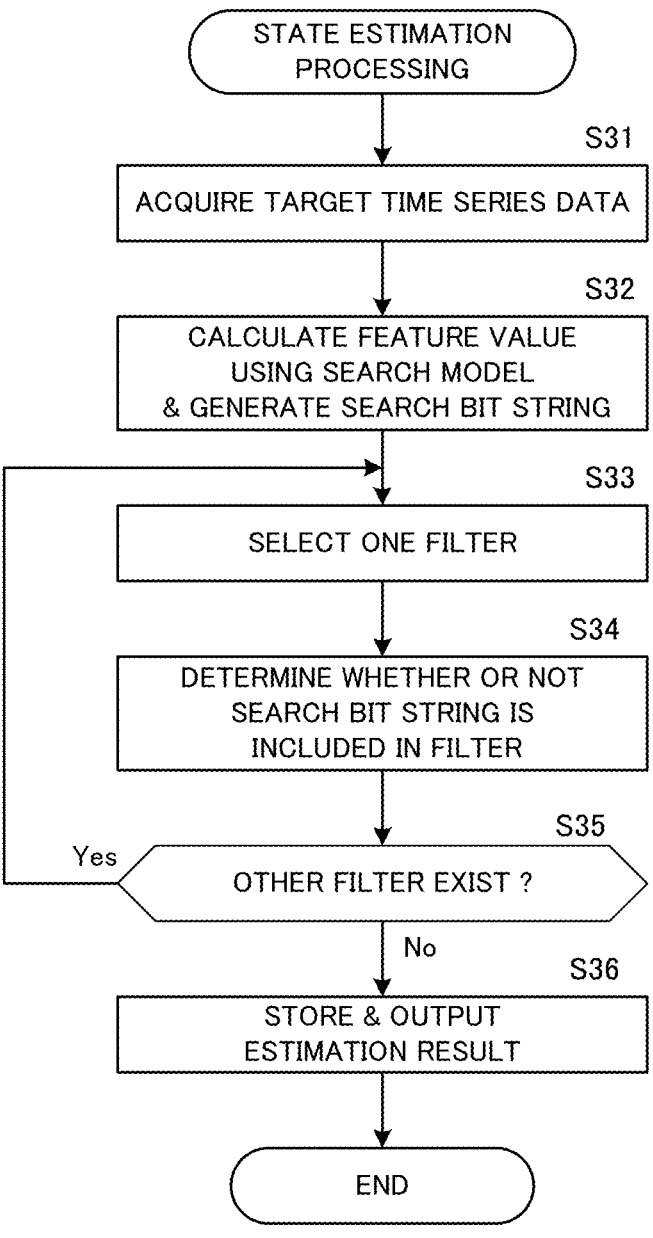
FIG. 8 is a flowchart of state estimation processing.

Next, state estimation processing preformed in the server 100 will be described. FIG. 8 is a flowchart of the state estimation processing. This processing is realized by the processor 112 shown in FIG. 5A, which executes a program prepared in advance and operates as each element shown in FIG. 6.

First, the target time series data corresponding to a particular state to be detected is inputted to the data input unit 121, and the data input unit 121 acquires the target time series data (step S31). Next, the feature value calculation unit 122 calculates the feature value from the target time series data using the search model and generates a search bit string (step S32).

Next, the state estimation unit 124 selects the filter of one terminal in the terminal information management unit 123 (step S33), and determines whether or not the search bit string is included in the filter, i.e., whether or not the search bit string conforms to the filter (step S34). The state estimation unit 124 estimates that the target time series data is included in the terminal corresponding to the filter when the search bit string is included in the filter, and estimates that the target time series data is not included in the terminal corresponding to the filter when the search bit string is not included in the filter.

Next, the state estimation unit 124 determines whether or not there are other filters in the terminal information management unit 123 (step S35). If there are other filters (step S35: Yes), the state estimation unit 124 repeats steps S33 to S34 for the other filters. On the other hand, when there is no other filter (step S35: No), the state estimation unit 124 stores or outputs the estimation result based on the respective filters obtained in step S34 (step S36). For example, the server 100 may display a list of terminals 200 estimated to correspond to the specific state to be detected on the display unit 116 or transmit a confirmation request as described above to the terminal 200 estimated to correspond to the specific state.

Estimation of Similar State

In the above-described example, in the state estimation, the server 100 calculates the feature value from the target time series data corresponding to the specific state to generate a search bit string, and collates the search bit string with the filter of each terminal to estimate whether or not each terminal is in the specific state. Alternatively, an ambiguity may be given to the search bit string to estimate a state similar to the specific state. Specifically, the following methods are conceivable.

(1) Method of Inverting Some Bits in the Search Bit String

In the above example, the state estimation unit 124 converts the target time series data into the feature value using the search model as shown in FIG. 4A to generate the search bit string, and collates the search bit string with the filter as shown in FIGS. 4B and 4C to estimate whether or not there is a state that coincides the specific state (for example, a normal state or an abnormal state).

Figure 4D:
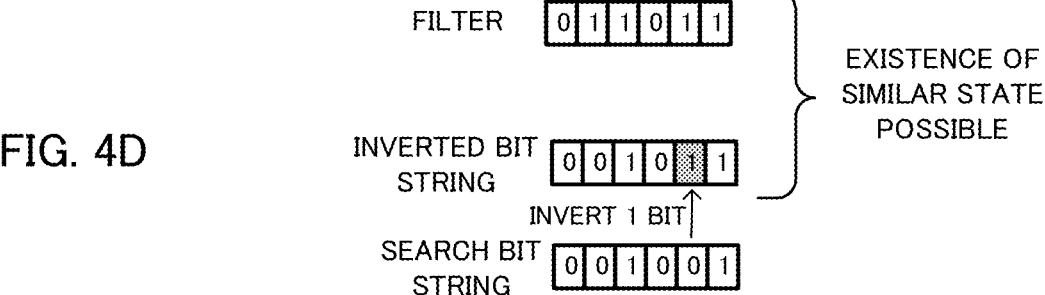

On the other hand, when estimating a state similar to the specific state, the state estimation unit 124 generates a search bit string in which one or more bits are inverted (hereinafter referred to as the "inverted bit string") in the generated search bit string, and collates the inverted bit string with the filter. FIG. 4D shows an example in which one bit of the search bit string is inverted. Thus, the inverted bit string represents not only the specific state but also the state similar to the specific state. By collating the inverted bit string with a filter, it is possible to estimate a state similar to the specific state.

(2) Method of Dividing a Filter into Multiple Filters

Figure 4E:
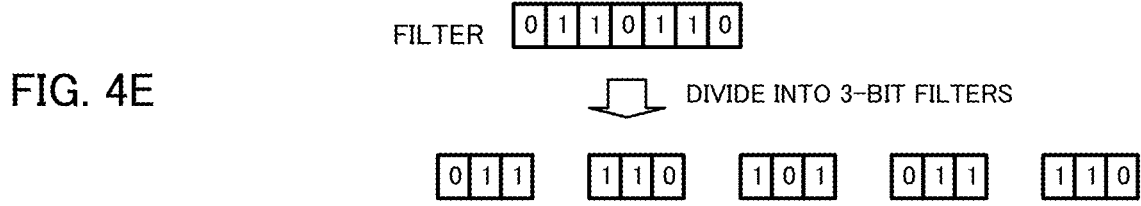

In another method, the state estimation unit 124 divides the filter into multiple filters. For example, as shown in FIG. 4E, the state estimation unit 124 divides a 7-bit filter into five pieces of 3-bit filters. In the example of FIG. 4E, three bits of the seven bits in the original filter are selected with shifting one bit at a time from left to right, and the original filter is divided into five filters.

The state estimation unit 124 divides a 7-bit search bit string into five pieces of 3-bit strings in the same manner. Then, the state estimation unit 124 collates the 3-bit search bit strings after the division with the corresponding 3-bit filters after the division. Assuming that the number of filters obtained by the division is "a" and the number of the search bit strings conforming to the filter is "b", the state estimation unit 124 determines that there is a state similar to the specific state when the ratio (b/a) of the number of coincidences between the search bit strings and the filters with respect to the number of the divided filters is equal to or larger than a predetermined threshold value. For example, assuming that the threshold value is ⅘ in the above example, the state estimation unit 124 estimates that there is a state similar to the specific state when four or more of the five search bit strings after division conform to the filter.

APPLICATION EXAMPLES

Next, description will be given of specific application examples of the above example embodiment.

(1) Analysis of Data of a New Terminal

The technique of the example embodiment can be used to analyze the data obtained in the new terminal. Usually, when a new terminal is deployed at a location, the local training data obtained at that location is used to train the analysis model in the terminal. However, in the early days of deploying the new terminal, there may be a case where the local training data is not enough and the training for adapting the analysis model to that location is insufficient. In such a case, data (time series data) acquired by the new terminal can be simply analyzed using the filters of other existing terminals collected in the server.

Figure 9A:
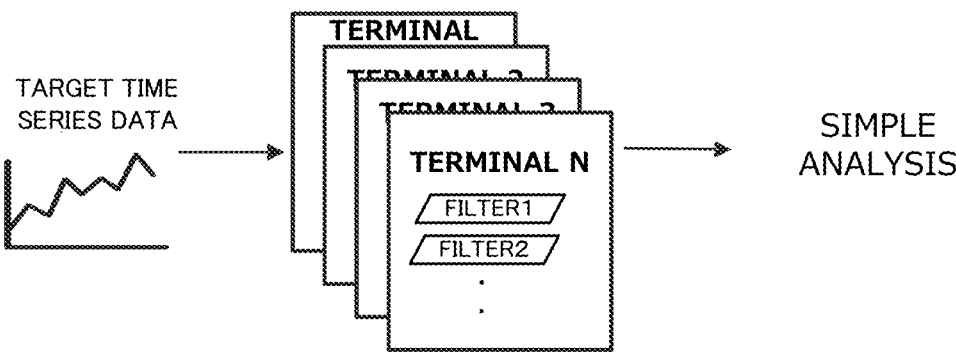
FIGS. 9A and 9B show an application example of the first example embodiment.

Specifically, as shown in FIG. 9A, the data acquired by the new terminal is inputted to the filters of the existing terminals 1 to N collected in the server 10, and the data acquired by the new terminal is simply analyzed based on the results. Other than the new terminal, the data of the terminal that does not have sufficient computational resources can be simply analyzed in the same manner using the filters collected from other terminals.

(2) Operation Mode Estimation

Figure 9B:
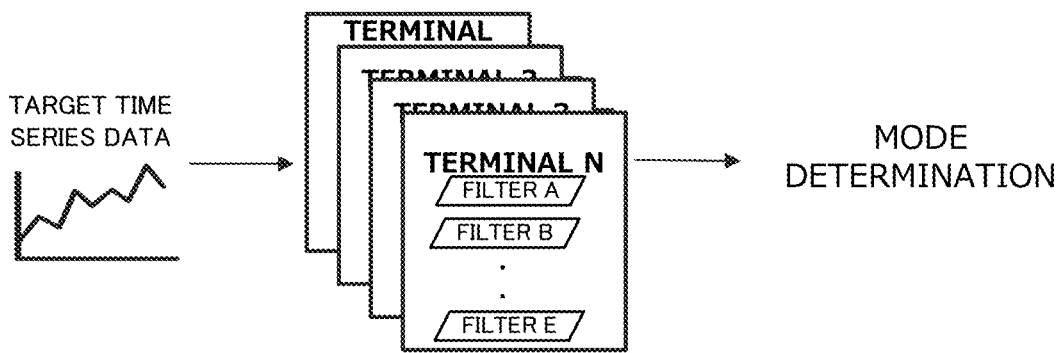

The technique of the example embodiment can be utilized for estimation of the operation state of each terminal (hereinafter, also referred to as "operation mode"). Specifically, as illustrated in FIG. 9B, a filter is generated for each operation mode in each terminal and collected in the server. For example, in each terminal, a filter A is generated using the time-series data obtained during operation in the operation mode A, and a filter B is generated using the time-series data obtained during operation in the operation mode B. In this manner, a filter for each operation mode is generated in each terminal. By this, if the feature value of a certain time-series data is included in (conforming to) the filter A, it can be estimated that the time-series data is the time-series data obtained during operation in the operation mode A.

Therefore, when certain time series data is obtained, the server can estimate the operation mode in which the time series data is obtained, by applying the target time series data to the set of filters collected from each terminal and determining the operation mode of the filters to which the target time series data conforms. For example, the server collates a certain time series data with the filters A to E of each terminal and counts the conforming filters. If the filter C has the highest number of conforming filters, the server 100 estimates that the target time series data is close to the operation mode C.

(3) Abnormality Detection

Figure 10:
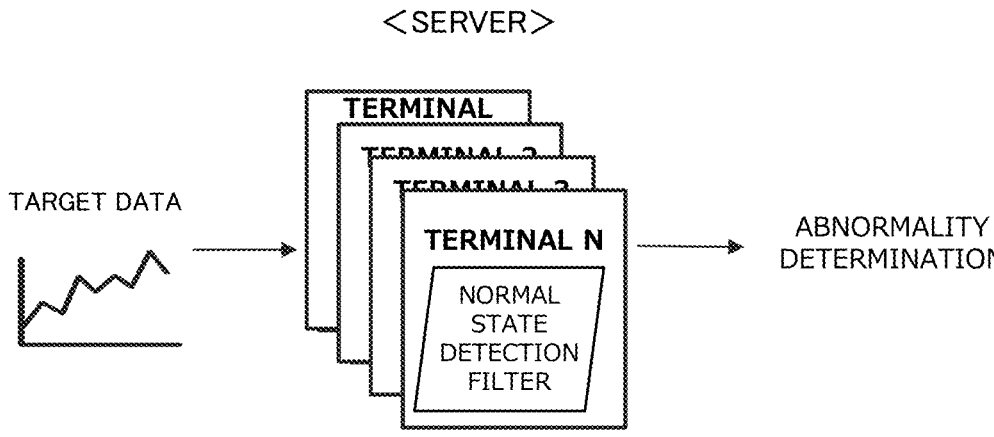
FIG. 10 shows another application example of the first example embodiment.

The technique of the example embodiment can be utilized for abnormality detection of each terminal. Specifically, as shown in FIG. 10, a filter is generated in each terminal using the time series data acquired while the terminal is operating normally. By this, the time series data obtained in the normal state of the terminal will conform to this filter, and the filter can be used as a filter for detecting a normal state (hereinafter, referred to as "normal state detection filter").

Therefore, the normal state detection filter generated in each terminal is collected in the server, and the server periodically instructs the terminal to transmit the time series data observed in each terminal to the server for monitoring. If the time series data transmitted from a terminal conforms to the normal state detection filter of the terminal, the server can estimate that the terminal is operating in the normal state. Conversely, if the time series data transmitted from the terminal does not conform to the normal state detection filter of the terminal, the server can estimate that the terminal possibly has an abnormality. In this case, the server can make necessary queries to the terminal. Thus, by collecting the normal state detection filter generated by each terminal in the server, it is possible to monitor whether or not each terminal is operating normally on the server side.

(4) Maintaining Anonymity and Confidentiality

Figure 11:
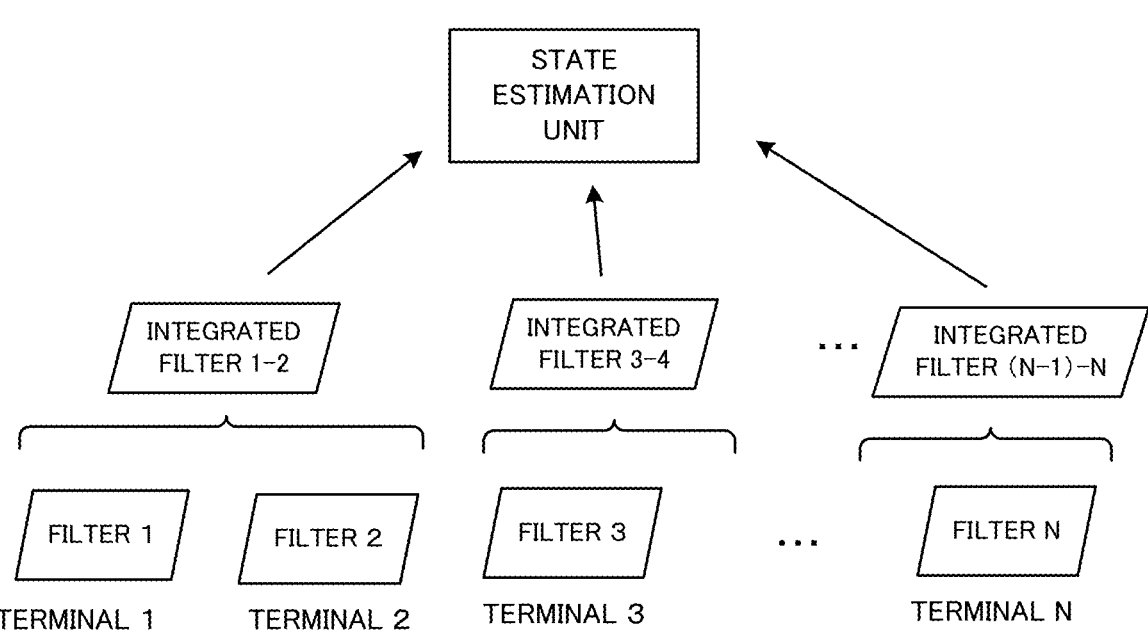
FIG. 11 shows still another application example of the first example embodiment.

When anonymity and confidentiality of the time series data itself is high, search with maintaining anonymity becomes possible by integrating multiple filters. Now, it is supposed that the filters 1 to N are generated in the terminals 1 to N as shown in FIG. 11. The server collects the filters 1 to N from the terminals 1 to N and then integrates multiple filters to generate integrated filters. For example, as shown in FIG. 11, the server integrates the filter 1 and the filter 2 to generate an integrated filter 1-2, and integrates the filter 3 and the filter 4 to generate an integrated filter 3-4.

If a certain time series data conforms to the integrated filter 1-2, the server can estimate that the certain time series data was obtained in one of the terminal 1 or the terminal 2, but cannot identify in which one of the terminal 1 and the terminal 2 the certain time series data was obtained. Thus, without identifying in which one of the terminal 1 and the terminal 2 the time series data is obtained, it is possible to identify the terminal corresponding to the time series data in the unit of groups. Thus, anonymity and confidentiality of the time-series data can be maintained.

FIG. 12 shows an example of maintaining anonymity of the time series data. In this example, the heart rate data of a person is used to estimate whether or not the person has a certain disease (hereinafter referred to as "X disease"). In this example, the heart rate data is used as the time series data, and the feature values are generated from the heart rate data of the persons who was diagnosed with X disease to generate the filter.

Figure 12A:
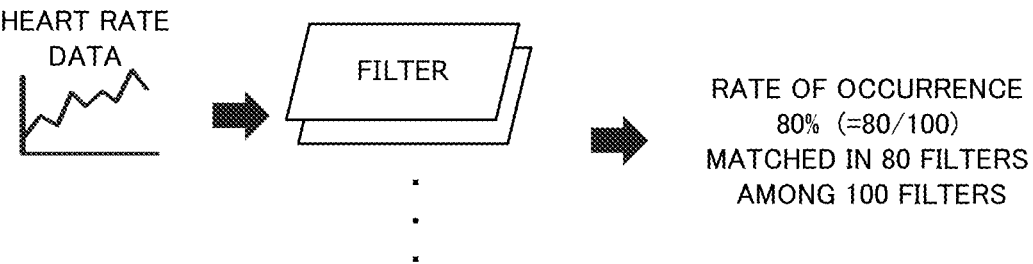
FIGS. 12A and 12B show still another application example of the first example embodiment.

In one method, a filter is generated individually for each person who is diagnosed with X disease using heart rate data, and the generated filters are collected. In this case, based on the result of collating a certain heart rate data with those filters, it is possible to calculate the probability that the heart rate data corresponds to X disease while maintaining anonymity. For example, as shown in FIG. 12A, multiple filters are generated based on the heart rate data of persons who were diagnosed with X disease. If a certain heart rate data is collated with those multiple filters and the heart rate data conformed to 80% of the filters, it can be estimated that the occurrence rate of X disease for that heart rate data is 80%.

Figure 12B:
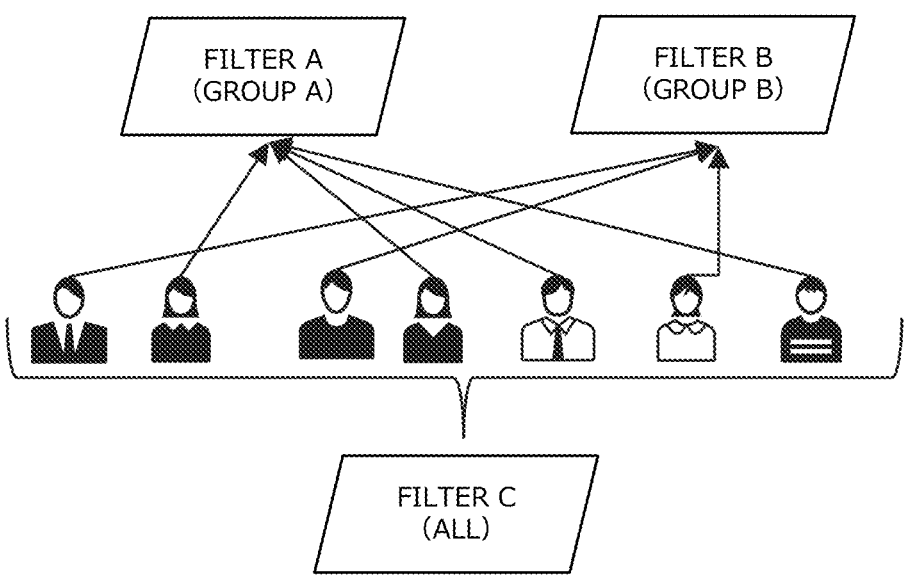

In another method, a filter may be generated individually for each person diagnosed with X disease, and filters A and B integrated for each group of a predetermined number of persons as shown in FIG. 12B may be generated. In this case, based on the result of collating a certain heart rate data with those filters, it is possible to obtain statistical information indicating what percent of the X disease patients the heart rate data occurs, while maintaining anonymity.

In yet another method, as shown in FIG. 12B, the filters generated individually for each person diagnosed with X disease are integrated to generate one filter C for all persons. In this case, based on the result of collating a heart rate data with the filter, it is possible to obtain information indicating whether the heart rate data is the data that can be seen even in one of X disease patients, while maintaining anonymity.

(5) When the Number of Terminals is Enormous

Incidentally, other than the case where anonymity and confidentiality of time-series data is an issue, for example, when the number of terminals is enormous, a method of integrating the filters is effective. When the number of terminals is enormous, the server needs to estimate the state of the terminal by collating the time series data with a large number of filters. Therefore, a predetermined number of filters are grouped to generate an integrated filter. For example, when there are 100 terminals, 10 terminals are grouped and the filters of the terminals are integrated in units of the group, 10 integrated filters are obtained. The server first collates the time series data with 10 integrated filters. Then, based on the results, the server may performs the state estimation by further collating the time series data with the filter for each terminal belonging to the group.

For example, it is assumed that the filter is a normal state detection filter described above. In this case, the server first performs state estimation using 10 integrated filters to identify the group including the terminal of the abnormal state, and further performs state estimation using the normal state detection filter of ten terminals included in the group to estimate which terminal is in the abnormal state.

Second Example Embodiment

Figure 13:
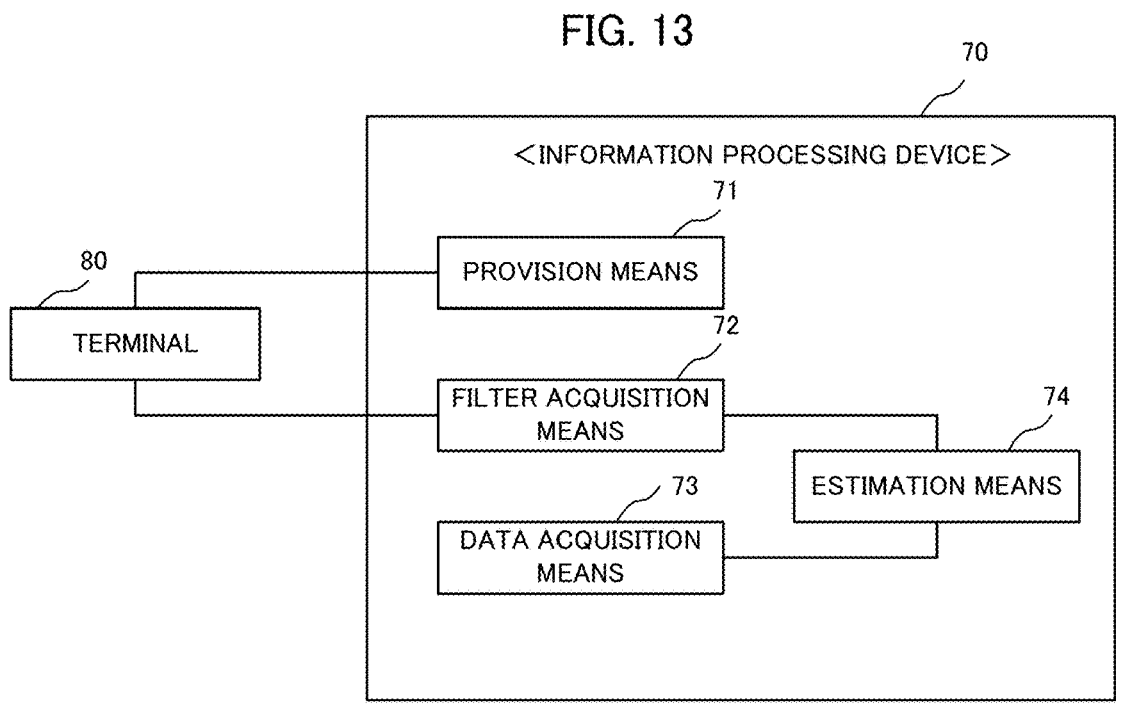
FIG. 13 is a block diagram showing a functional configuration of an information processing device according to a second example embodiment.

FIG. 13 is a block diagram illustrating a functional configuration of an information processing device according to a second example embodiment. The information processing device 70 includes a provision means 71, a filter acquisition means 72, a data acquisition means 73, and an estimation means 74.

Figure 14:
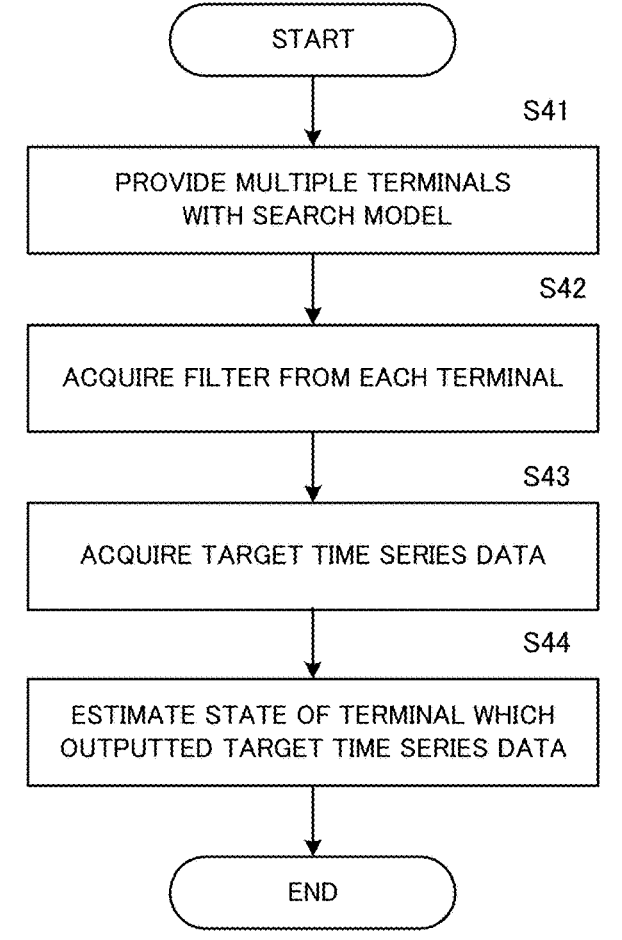
FIG. 14 is a flowchart of processing by the information processing device according to the second example embodiment.

FIG. 14 is a flowchart of processing performed by the information processing device 70 according to the second example embodiment. The provision means 71 provides multiple terminals with a common search model (step S41). The filter acquisition means 72 acquires, from each terminal, a filter configured by a feature value obtained using the search model (step S42). The data acquisition means 73 acquires, from each terminal, a target time series data subjected to state estimation (step S43). The estimation means 74 estimates a state of the terminal which outputted the target time series data, based on the target time series data and the filter (step S44).

According to the information processing device of the second example embodiment, the state of each terminal can be estimated using the time series data obtained in the terminal.

A part or all of the example embodiments described above may also be described as the following supplementary notes, but not limited thereto.

Supplementary Note 1

An information processing device comprising:

a provision means configured to provide multiple terminals with a common search model;

a filter acquisition means configured to acquire, from each terminal, a filter configured by a feature value obtained using the search model;

a data acquisition means configured to acquire, from each terminal, a target time series data subjected to state estimation; and an estimation means configured to estimate a state of the terminal which outputted the target time series data, based on the target time series data and the filter.

Supplementary Note 2

The information processing device according to Supplementary note 1, wherein the estimation means extracts a feature value from the target time series data using the search model, and estimates the state of each terminal based on whether or not the feature value is included in the filter.

Supplementary Note 3

The information processing device according to Supplementary note 2, wherein the filter is configured by a logical sum of the feature values extracted from the target time series data using the search model.

Supplementary Note 4

The information processing device according to Supplementary note 2 or 3,
  wherein the filter is configured by the feature value obtained from the time series data indicating a specific state of the terminal using the search model, and
  wherein, when the feature value extracted from the target time series data is included in the filter, the estimation means estimates that the terminal which outputted the target time series data is in the specific state corresponding to the filter.

Supplementary Note 5

The information processing device according to Supplementary note 2 or 3,
  wherein the filter is configured by the feature value obtained from the time series data indicating an operation mode of the terminal using the search model, and
  wherein, when the feature value extracted from the target time series data is included in the filter, the estimation means estimates that the terminal which outputted the target time series data is in the operation mode corresponding to the filter.

Supplementary Note 6

The information processing device according to Supplementary note 2 or 3,
  wherein the filter is configured by the feature value obtained from the time series data indicating a normal state or an abnormal state of the terminal using the search model,
  wherein, when the feature value extracted from the target time series data is included in the filter, the estimation means estimates that the terminal which outputted the target time series data is in the normal state or the abnormal state.

Supplementary Note 7

The information processing device according to any one of Supplementary notes 2 to 6, wherein the estimation means generates an integrated filter by integrating the filters acquired from the multiple terminals, and collates the feature value extracted from the target time series data with the integrated filter.

Supplementary Note 8

The information processing device according to any one of Supplementary notes 1 to 7, wherein the estimation means estimates the state of the terminal by using a filter in which a part of bits of the filter is inverted.

Supplementary Note 9

The information processing device according to any one of Supplementary notes 1 to 7, wherein the estimation means divides the filter into a plurality of filters and estimates the state of the terminal by using the divided plurality of filters.

Supplementary Note 10

An information processing method comprising:
  providing multiple terminals with a common search model;
  acquiring, from each terminal, a filter configured by a feature value obtained using the search model;
  acquiring, from each terminal, a target time series data subjected to state estimation; and
  estimating a state of the terminal which outputted the target time series data, based on the target time series data and the filter.

Supplementary Note 11

A recording medium recording a program, the program causing a computer to execute processing comprising:
  providing multiple terminals with a common search model;
  acquiring, from each terminal, a filter configured by a feature value obtained using the search model;
  acquiring, from each terminal, a target time series data subjected to state estimation; and
  estimating a state of the terminal which outputted the target time series data, based on the target time series data and the filter.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

100 Server
112, 212 Processor
121, 221 Data input unit
122 Feature value calculation unit
123 Terminal information management unit
124 State estimation unit
125 Confirmation request unit
200 Terminal
222 Filter generation unit
223 Analysis processing unit
224 Server cooperation unit

What is claimed is:
1. An information processing system comprising a server and a plurality of terminals,
  wherein each of the plurality of terminals comprises:
    a sensor;
    a first memory configured to store instructions; and a first processor configured to execute the instructions to:

receive a search model from the server;

generate a first feature value from a time series data output from the sensor using the search model;

generate a filter using the first feature value; and transmit the filter to the server, wherein the server comprises:

a second memory configured to store instructions; and a second processor configured to execute the instructions to:

provide each of the plurality of terminals with a common search model;

receive the filter from each of the plurality of terminals and store the filter into a storage;

acquire a target time series data corresponding to a certain state;

extract a second feature value from the target time series data using the search model; and estimate whether or not the terminal corresponding to the filter is in the certain state based on whether or not the second feature value is included in the filter, wherein the filter is configured by the feature value obtained from the time series data indicating a normal state or an abnormal state of the terminal using the search model, and wherein, when the second feature value extracted from the target time series data is included in the filter, the second processor estimates that the terminal which outputs the target time series data is in the normal state or the abnormal state.

2. The information processing system according to claim 1, wherein the filter is configured by a logical sum of the feature values extracted from the time series data using the search model.

3. The information processing system according to claim 1, wherein the processor generates an integrated filter by integrating the filters acquired from multiple terminals, and collates the second feature value extracted from the target time series data with the integrated filter.

4. The information processing system according to claim 1, wherein the second processor estimates the state of the terminal by using a filter in which a part of bits of the filter is inverted.

5. The information processing system according to claim 1, wherein the second processor divides the filter into a plurality of filters and estimates the state of the terminal by using the divided plurality of filters.

6. An information processing device comprising:

a memory configured to store instructions; and a processor configured to execute the instructions to:

provide a plurality of terminals with a common search model;

receive a filter from each of the plurality of terminals and store the filter into a storage, wherein the filter is generated from a first feature value extracted from a time series data output by a sensor of the terminal device;

acquire a target time series data corresponding to a certain state;

extract a second feature value from the target time series data using the search model; and estimate whether or not the terminal corresponding to the filter is in the certain state based on whether or not the second feature value is included in the filter, wherein the filter is configured by the feature value obtained from the time series data indicating a normal state or an abnormal state of the terminal using the search model, and wherein, when the second feature value extracted from the target time series data is included in the filter, the second processor estimates that the terminal which outputs the target time series data is in the normal state or the abnormal state.

7. An information processing method comprising:

providing a plurality of terminals with a common search model;

receiving a filter from each of the plurality of terminals and storing the filter into a storage, wherein the filter is generated from a first feature value extracted from a time series data output by a sensor of a terminal device;

acquiring a target time series data corresponding to a certain state;

extracting a second feature value from the target time series data using the search model; and estimating whether or not the terminal corresponding to the filter is in the certain state based on whether or not the second feature value is included in the filter, wherein the filter is configured by the feature value obtained from the time series data indicating a normal state or an abnormal state of the terminal using the search model, and wherein, when the second feature value extracted from the target time series data is included in the filter, the second processor estimates that the terminal which outputs the target time series data is in the normal state or the abnormal state.

8. A non-transitory computer-readable recording medium recording a program, the program causing a computer to execute the information processing method according to claim 7.

* * * * *